L. ANDERSON.
Machine for Cutting Veneers.
No. 205,230. Patented June 25, 1878.

WITNESSES:
C. Neveux
T. Sedgwick

INVENTOR:
L. Anderson
BY Munn & Co
ATTORNEYS.

2 Sheets—Sheet 2.
L. ANDERSON.
Machine for Cutting Veneers.
No. 205,230. Patented June 25, 1878.
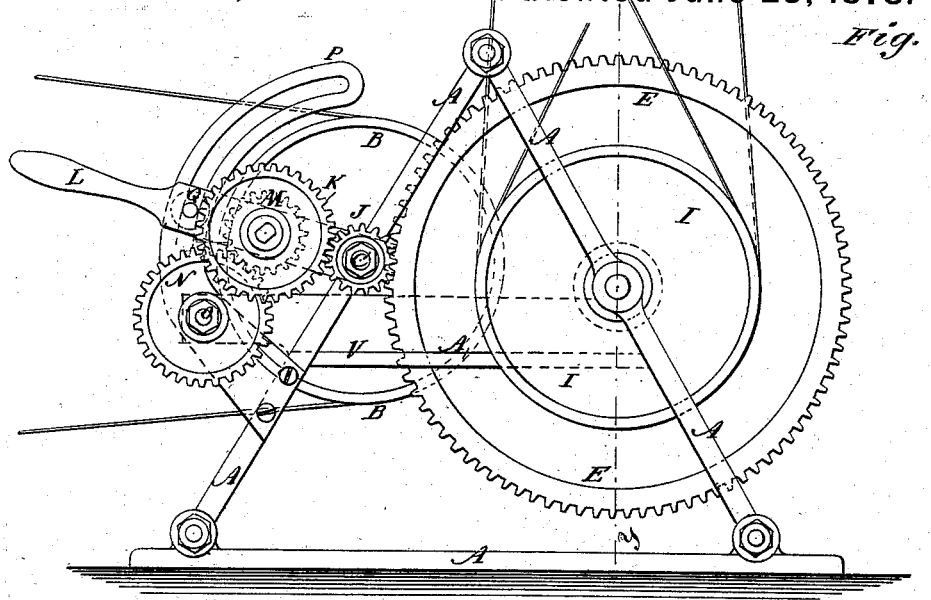
Fig. 3
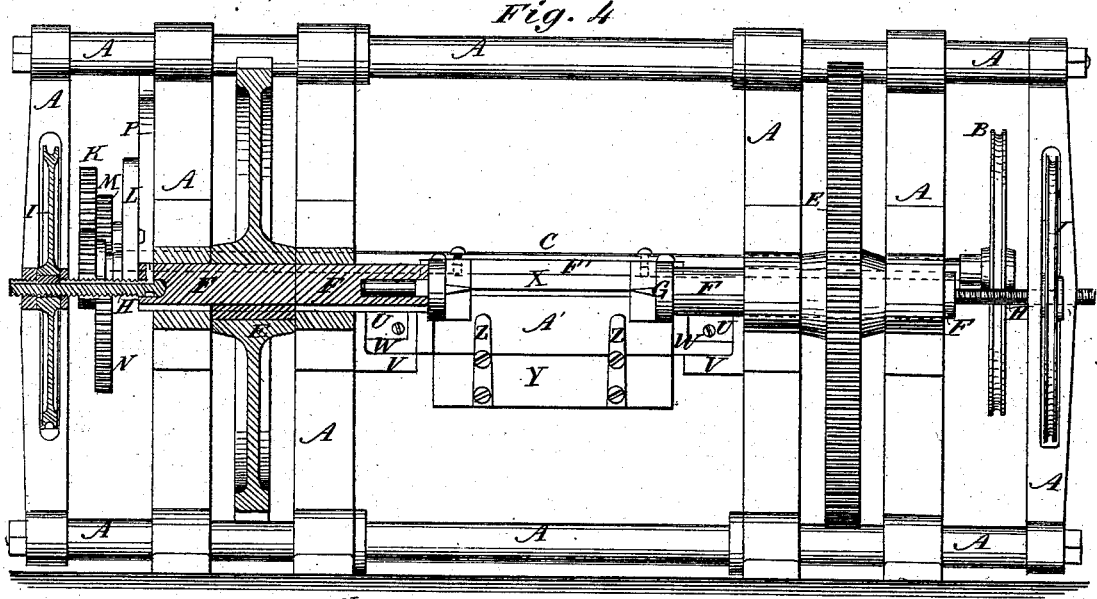
Fig. 4
Fig. 5
Fig. 6
WITNESSES:
C. Neveux
C. Sedgwick
INVENTOR:
L. Anderson
BY Munn & Co
ATTORNEYS.

UNITED STATES PATENT OFFICE.

LEONARD ANDERSON, OF PAINESVILLE, OHIO, ASSIGNOR TO HIMSELF AND CHARLES A. AVERY, OF SAME PLACE.

IMPROVEMENT IN MACHINES FOR CUTTING VENEERS.

Specification forming part of Letters Patent No. 205,230, dated June 25, 1878; application filed January 7, 1878.

*To all whom it may concern:*

Figure 1:
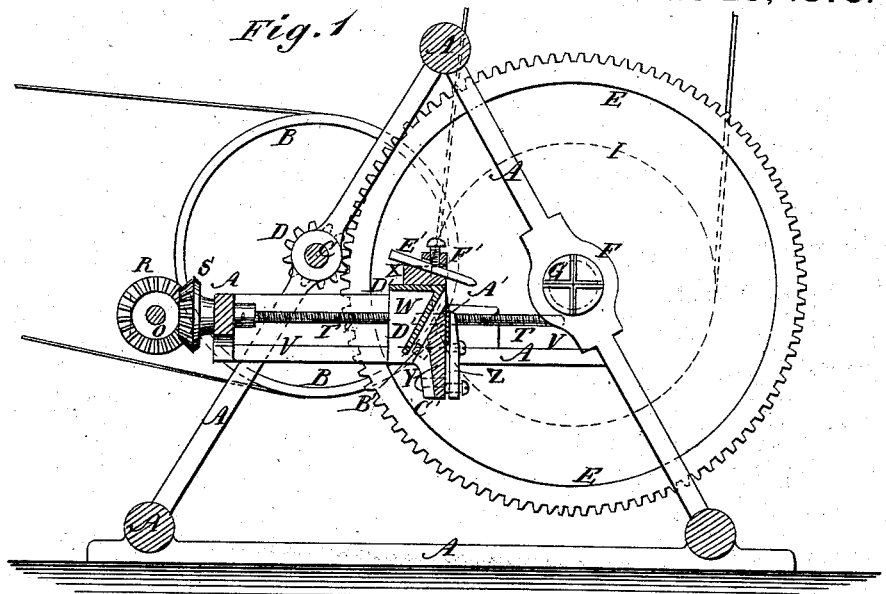
Figure 2:
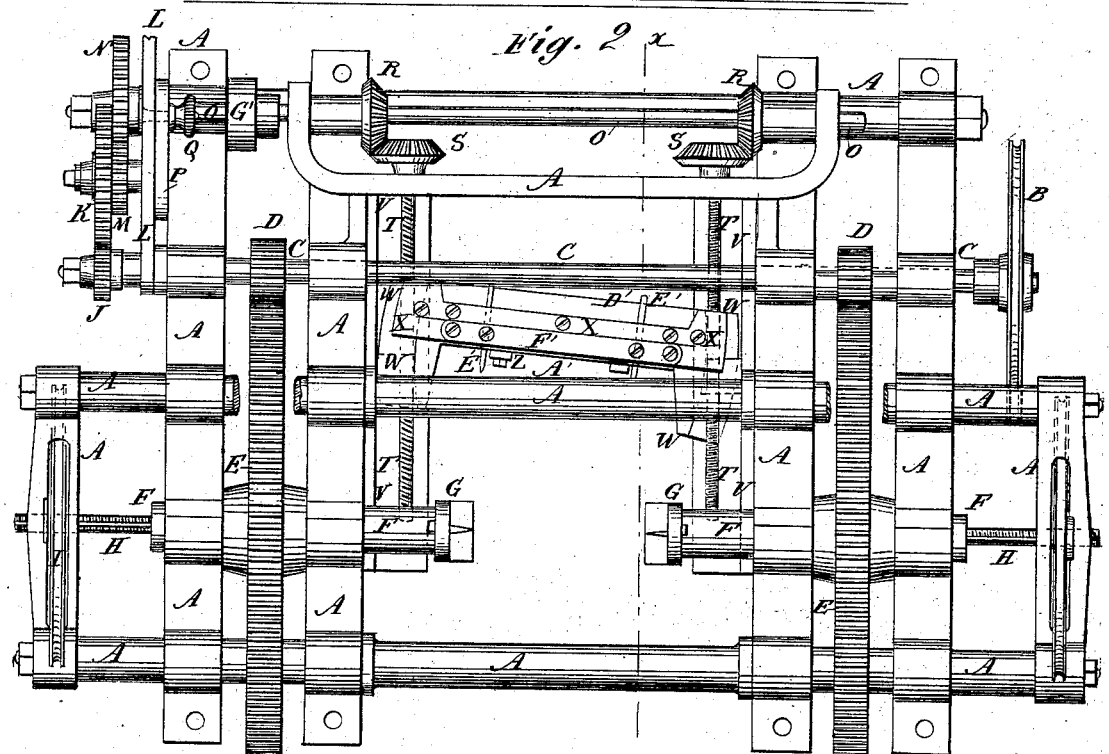

Be it known that I, LEONARD ANDERSON, of Painesville, in the county of Lake and State of Ohio, have invented a new and useful Improvement in Veneer-Cutting Machine, of which the following is a specification:

Figure 1, Sheet 1, is a vertical cross-section of my improved machine, taken through the line $x\,x$, Fig. 2. Fig. 2, Sheet 1, is a top view of the same, parts being broken away to show the construction. Fig. 3, Sheet 2, is an end view of the machine. Fig. 4, Sheet 2, is a front view of the same, partly in section, through the line $y\,y$, Fig. 3, to show the construction. Fig. 5, Sheet 2, is a top view of the knife and its driving-nuts, screws, and supports, the pressure-bar and its attachments being removed. Fig. 6, Sheet 2, is a detail view of the crozing-knife.

Similar letters of reference indicate corresponding parts.

The object of this invention is to furnish an improved machine for cutting veneers, either straight or tapered, for pails, buckets, &c., from logs of any size, and which shall be simple in construction, convenient in use, and effective and reliable in operation, cutting the veneers evenly and without breaking or checking them.

A is the frame of the machine, which is made triangular in its cross-section, as shown in Figs. 1 and 3. This construction of the frame A gives the operating parts of the machine a firm and stable support with a comparatively small amount of material, and at the same time gives convenient access to said operating parts.

B is the driving-pulley, to which motion is given from a counter-shaft above the machine, by a straight and a crossed belt, so that the direction of motion may be changed, as required.

The pulley B is attached to the end of a shaft, C, that revolves in bearings attached to the rear inclined bars of the frame A, and to it are attached two small gear-wheels, D, the teeth of which mesh into the teeth of two large gear-wheels, E, placed upon the mandrels F, and connected with them by tongues and grooves, so that they may carry the said mandrels with them in their revolution, while allowing the mandrels to have a free longitudinal movement through them.

The gear-wheels E are kept from moving laterally upon the mandrels F by the inclined bars of the frame A, against which the ends of their hubs rest.

In the inner ends of the mandrels F are formed sockets to receive the shanks, and cross-slots to receive ribs formed upon the bases of the clutches G that grasp, center, and rotate the log to be operated upon.

To the outer ends of the mandrels F are swiveled the ends of the screws H, which pass through screw-holes in the slotted inclined bars of the frame A, and are grooved longitudinally to receive the tongues or keys by which the pulleys I, placed upon them within said slots, are made to turn them.

The pulleys I are driven from the counter-shaft by a straight and a crossed belt, so that the direction of motion may be changed to force the clutches G forward or draw them back, as may be desired.

To the end of the driving-shaft C is attached a small gear-wheel, J, the teeth of which mesh into the teeth of a larger gear-wheel, K, pivoted to a lever, L.

With the gear-wheel K is rigidly connected a smaller gear-wheel, M, the teeth of which mesh into the teeth of a larger gear-wheel, N, attached to the feed-shaft O, so that the said feed-shaft may be driven with a slow motion from the driving-shaft C of the machine. The feed-shaft O revolves in bearing attached to the frame A.

The inner end of the lever L is pivoted to and rides upon the driving-shaft C, so that the gear-wheel M may be moved away from the gear-wheel N to throw the feed-shaft O out of gear when desired.

The lever L moves along a curved arm, P, attached to the frame A, and which is slotted longitudinally to receive a clamping-screw, Q, which passes through the said slot and screws into the said lever, so as to clamp the lever securely in any position into which it may be adjusted.

To the feed-shaft O are attached two bevel-gear wheels, R, the teeth of which mesh into the teeth of two bevel-gear wheels, S, attached to the outer ends of the feed-screws T, and which are swiveled to a bar of the frame A. The screws T pass through nuts U, placed in notches in the shoes W, which slide in rabbets or ways on bars V, attached to the frame A.

To the shoes W are bolted the ends of a bar, X, called by me a "pressure-bar," so that the said bar X may be carried forward and back by the shoes W in their movement. The shoes W are rounded off upon their outer sides, so that either end of the bar X may be carried forward faster than the other, as may be required, in cutting veneers for pails, buckets, and other uses that require tapering veneers.

With this construction, by making both screws T of the same pitch the bar X will be carried forward squarely, so that the machine will cut straight veneers.

By making the threads of the two screws T of different pitch one end of the bar X will be carried forward faster than the other to cut tapering veneers, the amount of taper depending upon the difference in the pitch of the two screws.

Upon the lower parts of the shoes W are formed, or to them are attached, the ends of a downwardly-projecting plate, Y, to the forward side of which are bolted clamps Z to receive the knife A'. The upper ends of the clamps Z are forced toward the plate Y, to clamp the said knife A' to said plate Y, by set-screws passing through their lower ends and resting against the lower part of the said plate Y. The rear upper part of the plate Y is beveled to form an inclined surface for the veneer to move along as it is cut.

B' is a knife, which is made of such a shape as to form the croze in the veneer as it passes along the inclined surface of the plate Y, and which may be so formed as to croze and chamfer the veneer at the same time. The crozing-knife B' is clamped to the plate Y by a block, C', bolted to the said plate Y.

D' is an angular plate, called by me a "pressure-plate," and the upper or horizontal part of which is bolted to the lower side of the pressure-bar X. The angle of the plate D' is such that its lower part may be parallel with the beveled or inclined surface of the plate Y, and the said plate is so arranged that its lower or inclined part may be at a distance from the inclined surface of the said plate Y about equal to the thickness of the veneers being cut, so that the plate D' may hold the veneers down with sufficient force to prevent them from being broken, split, or checked, and to cause the knife B' to croze them properly. The edges of the veneers are cut off upon the proper lines by the knives E', which are placed in notches in the forward upper part of the pressure-bar X, and are secured in place by the bar F', bolted to the upper side of said pressure-bar.

G' is a pulley to receive a belt passing to the counter-shaft, to turn the feed-screws T forward and back with a rapid motion when required.

Having thus described my invention, I claim as new and desire to secure by Letters Patent—

1. The knife-edge arranged to vary its angle automatically by means of the unequally-pitched screws T, sliding shoes W, and bar X, as shown and described, for the purpose specified.

2. The combination of the nuts V, the shoes W, the pressure-bar X, the knife-plate Y, and the knife A' with the bars V and the swiveled feed-screws T, whether the threads of the said screws have the same or a different pitch, substantially as herein shown and described.

LEONARD ANDERSON.

Witnesses:
A. A. AMIDON,
J. H. PAINE.